United States Patent

Nelles et al.

[11] Patent Number: 5,967,026
[45] Date of Patent: Oct. 19, 1999

[54] APPARATUS FOR THE MANUFACTURE OF REDUCED AND LOW-FAT PASTA FILATA CHEESE

[75] Inventors: Jakob Nelles, 1048 Pershing Rd., Maquoketa, Iowa 52060; Brian G. Anderson, Stirling, Canada

[73] Assignee: Jakob Nelles, Maquoketa, Iowa

[21] Appl. No.: 09/257,634

[22] Filed: Feb. 25, 1999

Related U.S. Application Data

[62] Division of application No. 08/869,114, Jun. 4, 1997.

[51] Int. Cl.[6] ............................. A01J 25/00; A01J 25/11; A23C 19/00; A23C 19/02

[52] U.S. Cl. ................................ 99/453; 99/452; 99/462; 99/516

[58] Field of Search ..................... 99/452–455, 460–466, 99/456–459, 483, 516; 366/318, 149; 118/13, 16, 19, 20; 426/36, 582, 512, 517; 425/149, 261, 327, 208, 350

[56] References Cited

U.S. PATENT DOCUMENTS

| 3,713,220 | 1/1973 | Kielsmeier et al. | 99/459 |
| 3,910,174 | 10/1975 | Nelles | 99/452 |
| 4,091,721 | 5/1978 | Cosmi | 99/453 |
| 4,110,484 | 8/1978 | Rule et al. | 426/582 |
| 4,112,835 | 9/1978 | Mongiello | 99/455 |
| 4,339,468 | 7/1982 | Kielsmeier | 426/517 X |
| 4,592,274 | 6/1986 | Tomatis | 425/327 X |
| 4,608,921 | 9/1986 | Mongiello, Sr. | 99/455 |
| 4,665,811 | 5/1987 | Meyer | 99/460 X |
| 4,679,497 | 7/1987 | Tomatis | 99/455 |
| 4,682,538 | 7/1987 | Zahlaus | 99/453 |
| 4,898,745 | 2/1990 | Zamzow et al. | 99/454 X |
| 5,529,795 | 6/1996 | Aldrovandi | 425/149 X |

*Primary Examiner*—Timothy F. Simone
*Attorney, Agent, or Firm*—Quarles & Brady

[57] ABSTRACT

An apparatus and process for producing reduced and low-fat, high-quality pasta filata cheese incorporates a rice-based cheese substitute into freshly manufactured pasta filata cheese through a kneading, spraying process that preserves the integrity of the cheese's fiber structure.

9 Claims, 2 Drawing Sheets

APPARATUS FOR THE MANUFACTURE OF REDUCED AND LOW-FAT PASTA FILATA CHEESE

CROSS-REFERENCE TO RELATED APPLICATIONS

This is a divisional of application Ser. No. 08/869,114, filed Jun. 4, 1997.

STATEMENT REGARDING FEDERALLY SPONSORED RESEARCH OR DEVELOPMENT

BACKGROUND OF THE INVENTION

The invention relates generally to an apparatus and method for the production of reduced and low-fat pasta filata cheeses such as mozzarella cheese, and in particular, to an apparatus and process for incorporating a rice-based, reduced and low-fat cheese substitute into pasta filata cheese without adversely affecting the texture of the cheese.

Pasta filata (plastic curd) cheeses are Italian-type cheeses in which the curd is worked to develop a fiber or string-like texture providing an elasticity in the finished cheese desired by consumers.

Pasta filata cheeses are kneaded while the curd is still in the plastic state to develop the desired texture. This kneading was originally performed by hand, but now may be performed by motor driven stretchers. In such a stretcher, augers fitting loosely within a trough, stretch and compress cheese curd as it is conveyed along the extent of the trough. The stretching develops the fiber or string-like quality for which pasta filata cheeses are valued. The kneading process is conducted at approximately 140 degrees Fahrenheit sufficient to provide plasticity to the cheese but below the melting point of the cheese where the fiber structure of the cheese would be lost through melting.

Once the structure of the cheese has been developed, the cheese curd is transferred to a molder/chiller system which divides the curd into blocks and cools it. Stretchers and molder/chillers suitable for this purpose are also commercially available from the JOHNSON/Nelles Corporation of Windsor, Wis.

The cheese blocks may then be transferred to a brining pit in which cold brine chills and floats the blocks to prevent deformation during the remaining cooling process. The chilling in cold brine also adds some salt to the cheese. When the cheese block center core has reached approximately 45 to 55 degrees Fahrenheit and has the desired salt content requested by the industry of 1.2–1.7%, it may be packaged.

Interest in reduced and low-fat foods has lead to the development of pasta filata cheeses incorporating reduced and low-fat cheese substitutes. Such substitutes are mixed into the milk used to generate the curd for the pasta filata cheese prior to its fermentation or maybe blended into finished pasta filata by grinding the pasta filata and blending it with the substitute, then melting the blended ingredients together. While these products are frequently referred to as pasta filata type cheeses, their texture and quality make them readily distinguishable from true pasta filata cheese.

BRIEF SUMMARY OF THE INVENTION

The present invention provides a method of incorporating a cheese substitute, such as one based on rice, into a pasta filata cheese without detrimentally affecting its fiber structure and hence its texture. In the invention, the cheese substitute is sprayed in liquid form on the surface of the pasta filata curd as it is kneaded. The kneading is accomplished without cutting or melting of the cheese.

Although the inventors do not wish to be bound by a particular theory, it is believed that a microscopic coating of the fibers of the cheese is obtained and that this coating as opposed to cutting of the fibers preserves the elasticity and texture of the pasta filata cheese. It is further believed that the addition of the rice-based cheese substitute only to finished pasta filata cheese, makes it less likely that the substitute will detrimentally affect the formation of the cheese's structure, in contrast to methods that add the substitute prior to fermentation.

Specifically the present invention provides in one embodiment, an apparatus for the manufacture of reduced and low-fat pasta filata cheese from a combination of standard pasta filata cheese and a rice-based cheese substitute. The apparatus includes a kneader having a kneading vessel including a receiving opening accepting standard pasta filata cheese. Within the kneading vessel is positioned a motor driven kneader to alternately stretch and compress the standard pasta filata cheese without substantially cutting the fibers. A spray head directed into the kneading vessel and connected to a portion controlled pump receives a rice-based cheese substitute and forces it under pressure to coat the surface of the kneaded cheese.

Thus, it is one object of the invention to provide an apparatus for incorporating a cheese substitute into pasta filata cheese without detrimentally affecting the formation or integrity of the cheese fibers. The kneading action is believed to incorporate the substitute along the surface of cheese fibers without fundamentally affecting the fibers themselves.

The kneading vessel may include a heating jacket, heated to a temperature of 140–150 degrees.

It is another object of the invention to preserve the temperature at which the fibers were originally formed in the pasta filata manufacturing process to promote incorporation of the substitute without loss of fiber structure.

The kneader may comprise at least one auger and typically two substantially parallel and intermeshing counter-rotating augers. The kneading vessel may be an elongated trough wherein the receiving opening is positioned at one end of the trough and wherein the opposite end of the trough includes an exit opening. The auger may turn so as to advance the combined standard pasta filata cheese and rice-based cheese substitute along the trough from the receiving opening to the exit opening on a substantially continuous basis as the cheese is stretched and compressed.

Thus, it is another object of the invention to provide a process for producing reduced and low-fat pasta filata cheese of high quality that may be performed on a substantially continuous basis. The apparatus of the present invention may be easily positioned between a pasta filata stretching machine and a molder chiller and brine tank without significant change in these preexisting pieces of equipment.

The apparatus may include a macerator for receiving the rice-based cheese substitute in solid form and liquefying it for receipt by the pump. The macerator may include a heating jacket for heating the rice-based cheese substitute to 185–190 degrees Fahrenheit prior to receipt by the spray head.

Thus, it is another object of the invention to provide an apparatus for producing reduced and low-fat pasta filata cheese that may accept previously prepared blocks of rice-based cheese substitute and liquefy them and heat the substitute as it is needed.

The foregoing and other objects and advantages of the invention will appear from the following description. In this description, reference is made to the accompanying drawings which form a part hereof and in which there is shown by way of illustration a preferred embodiment of the invention. Such embodiment does not necessarily represent the full scope of the invention, however, and reference must be made therefore to the claims for interpreting the scope of the invention.

DETAILED DESCRIPTION OF THE INVENTION

Apparatus and Process

Figure 1:
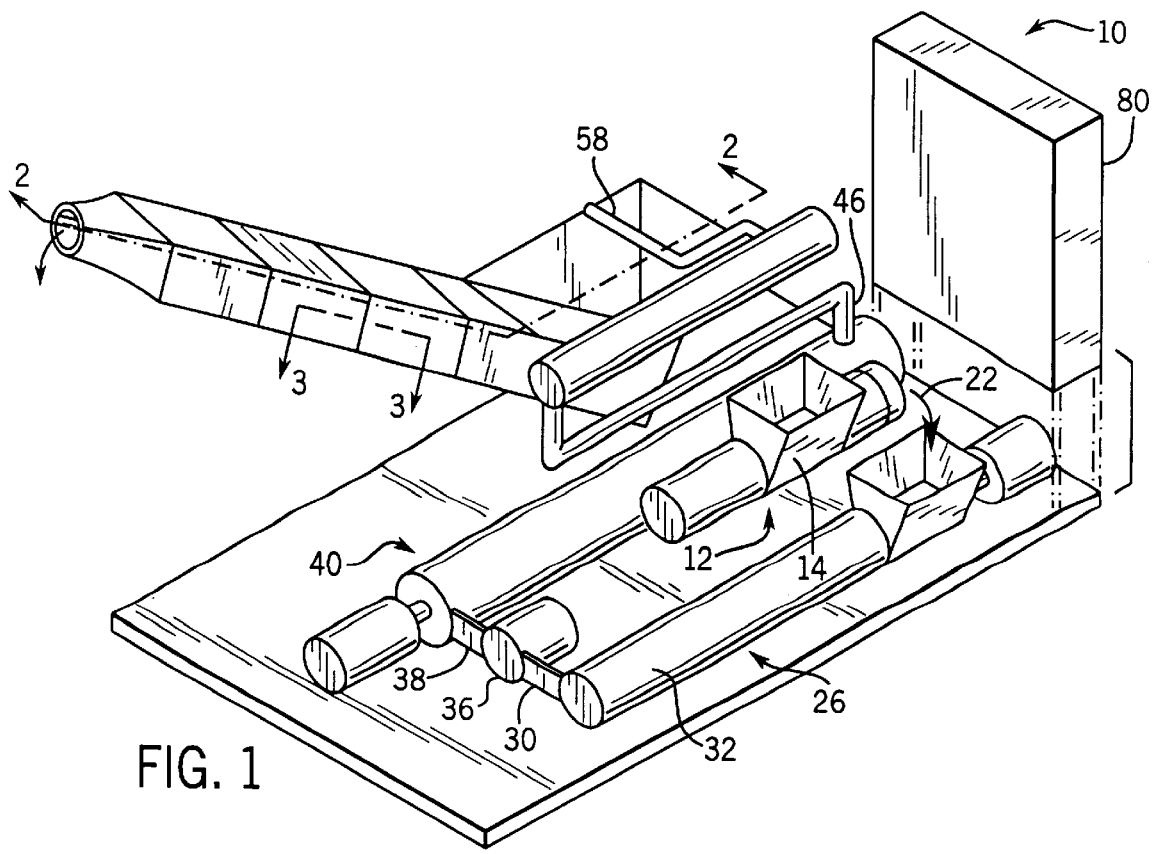
FIG. 1 is a simplified perspective view of the apparatus of the present invention for producing a reduced and low-fat pasta filata cheese showing a multiple auger heating system for the rice-based cheese substitute and a spray nozzle positioned over a hopper receiving standard pasta filata cheese and communicating with an upwardly extending kneading vessel.
Figure 4:
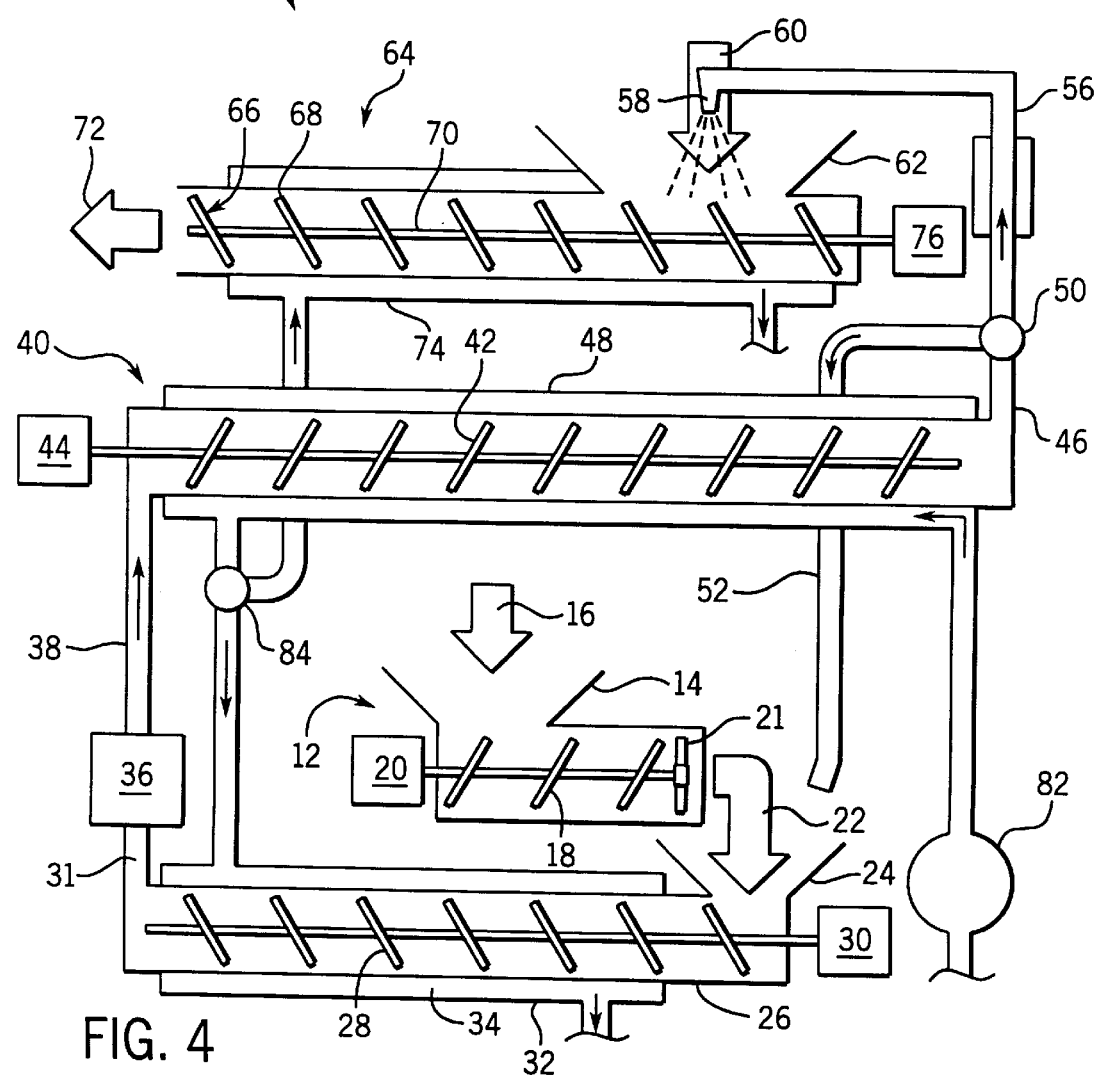
FIG. 4 is a block diagram of the apparatus of FIGS. 1–3 showing the path of the rice cheese substitute and standard pasta filata cheese during the process.

Referring now to FIGS. 1 and 4, a reduced and low-fat cheese manufacturing apparatus 10 includes a motor-driven grinder 12 of conventional design having a hopper 14 sized to receive blocks of a rice-based cheese substitute 16 whose preparation will be described in detail below. An auger 18 (shown in FIG. 4) is positioned within the grinder 12 and driven by motor 20 to force the semi-solid rice-based cheese substitute 16 past a cutter head 21 so as to be macerated and extruded as indicated by arrow 22 for receipt by a second hopper 24.

The second hopper 24 opens into one end of a tubular heating chamber 26 which includes a second auger 28 driven by motor 30 to move the macerated rice-based cheese substitute 16 along the length of the tubular heating chamber 26 from the hopper 24 to an exit port 31 at the opposite end of the tubular heating chamber 26. The tubular heating chamber 26 is jacketed by a concentric water jacket 32 through which heated water 34 is passed. The heated water 34 is given a temperature so as to heat the macerated rice-based cheese substitute 16 to approximately 120 degrees Fahrenheit as it passes along tubular heating chamber 26.

When the rice-based cheese substitute 16 reaches exit port 31, it is sufficiently liquefied so that it may be received by a metering pump 36 of conventional design which provides a precise volume flow of the rice-based cheese substitute 16 into connecting pipe 38 leading to a second tubular heating chamber 40. Second tubular heating chamber 40 is similar in construction to tubular heating chamber 26 having a generally cylindrical lumen holding a third auger 42 driven by a motor 44 to move the liquefied cheese rice substitute from connecting pipe 38 to an exit port 46. Again, second tubular heating chamber 40 has a hot water jacket 48 regulated to adjust the rice-based cheese substitute 16 to a temperature from 185–190 degrees Fahrenheit. The heated and liquefied rice-based cheese substitute 16 exit port 46 to valve 50 which may recirculate the rice-based cheese substitute 16 through recirculation pipe 52 back to hopper 24 so as to constantly keep the rice-based cheese substitute 16 flowing and heated, even if cheese is not actively being processed.

When pasta filata cheese is being processed, the rice-based cheese substitute 16 passes through tube 56 to a spray nozzle 58. The nozzle 58 is a length of pipe having a plurality of holes drilled in its lower surface to provide an orifice through which a rice-based cheese substitute 16 may exit.

Figure 2:
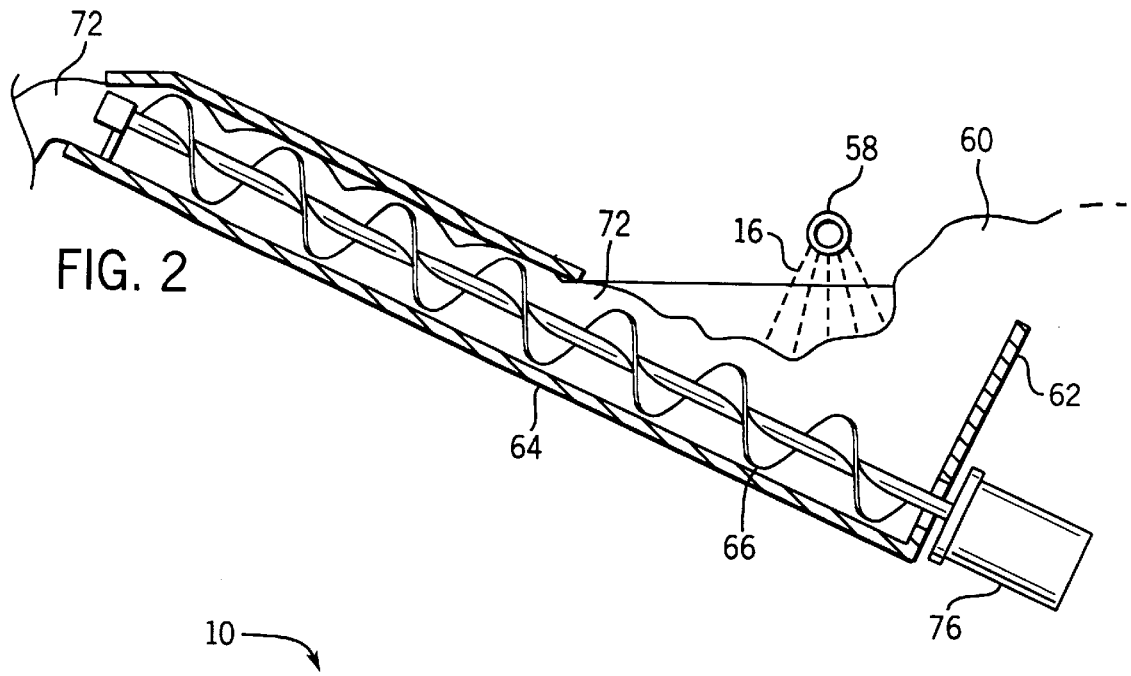
FIG. 2 is a cross sectional view of the kneading vessel and spray nozzle of FIG. 1 taken along lines 2—2 of FIG. 1 showing the internal auger and the path of standard pasta filata cheese into the upwardly opening hopper.

Referring now to FIGS. 1, 2, and 4, the reduced and low-fat cheese manufacturing apparatus 10 may be positioned to receive standard pasta filata cheese 60 directly from a stretching machine, but prior to its molding, chilling, or brining. Ideally, the pasta filata cheese 60 is delivered from the stretcher (not shown) at a temperature of approximately 140 degrees Fahrenheit and has a fully formed fiber structure. The pasta filata cheese 60 drops into hopper 62 at the base of an upwardly sloping kneading chamber 64. Referring in particular to FIG. 4, the kneading chamber 64 is jacketed with a concentric water jacket 74 adjusted to a temperature of approximately 140 degrees Fahrenheit, but beneath the melting point of the cheese mixture 72. The spray nozzle 58 is positioned above the hopper so that liquefied and heated rice-based cheese substitute 16 may be sprayed upon the surface of the pasta filata cheese 60 as it enters the hopper 62. The flow rate of the pasta filata cheese 60 and the rice-based cheese substitute 16 from nozzle 58 may be adjusted so that the combined pasta filata cheese 60 and rice-based cheese substitute 16 (cheese mixture 72)is as high as 10–15% rice-based cheese substitute 16 by weight.

Figure 3:
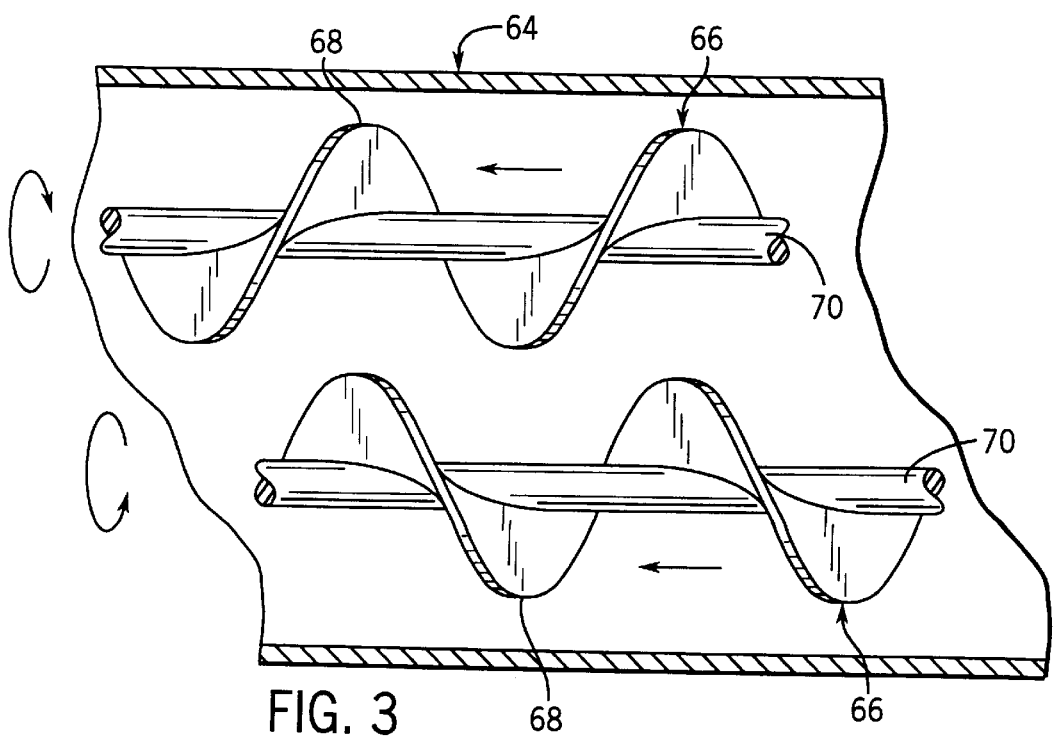
FIG. 3 is a detailed fragmentary cross-sectional view taken along lines 3—3 of FIG. 1 showing two kneading augers within the kneading chamber of FIG. 2 in intermeshed counter-rotating configuration.

Referring now to FIGS. 2 and 3, positioned within the kneading chamber 64 are twin augers 66 having helical vanes 68 passing in helixes of opposite "hand" around shafts 70 so that the vanes 68 may intermesh while the shafts 70 turn in opposite directions. A motor 76 turns the augers 66 through a conventional gear drive as will be understood to those of ordinary skill in the art. The augers 66 so turning provide a generally upward motion to the mixture of the pasta filata cheese 60 and the rice-based cheese substitute 16 through the kneading chamber 64.

The clearance between the vanes 68 and the walls of the kneading chamber 64 and the pitch and speed of the augers 66 is adjusted so that the cheese mixture 72 is stretched and folded between the augers and the inside of the kneading chamber 64 without cutting, so that the fibers of the cheese are preserved, yet coated uniformly with the rice-based cheese substitute 16. Generally, the augers 66 provide a similar action to hand kneading in which the palm of the hand is pressed against a lump of dough of cheese to roll it along a hard surface, stretching and compressing the cheese back upon itself.

At the upper end of the kneading chamber 64 is an exit opening through which the cheese mixture 72 exits as a reduced and low-fat pasta filata cheese. It may then be received by a molder chiller or brining tank of conventional design.

The reduced and low-fat cheese manufacturing apparatus 10 is generally instrumented and controlled through a control panel 80 providing control for the speed of the metering pump 36 of the motors 30, 44, and 76 and of valves necessary to hold the temperatures of the water jackets 74, 48, and 32 within the range as described. The heated water 34 may be provided by a steam heat exchanger 82 shown in FIG. 4 which provides heated water 34 directly to hot water jacket 48 which may then be cooled and transmitted to jackets 74 and 32 by metering valve 84.

The Rice Cheese Substitute

The rice-based cheese substitute 16 is formed principally of rice and water mixed and heated until it reaches a gel-like consistency. Preferably, the rice may be crushed in a grinder to a consistency of approximately two millimeter particle size. A ribbon blender may then be used to mix the rice with approximately twenty five percent water by weight while it is heated to 160 degrees Fahrenheit for at least thirty seconds. The rice is then allowed to cool for approximately one hour with blending while other ingredients are added until it has reached approximately 70 degrees Fahrenheit. It is then molded into forty-pound blocks and refrigerated. The blocks are fed into the hopper 14 of the reduced and low-fat cheese manufacturing apparatus 10 as they are needed.

Although the exact composition of the rice mixture may vary, in a preferred embodiment the rice mixture is compounded of the following ingredients:

| Ingredient | Percent by weight |
|---|---|
| Water | 39% |
| Rice | 37.2% |
| Corn syrup | 7.1% |
| Whey powder | 4.8% |
| B950 food starch | 4.8% |
| Maltrin M040 | 4.8% |
| Salt | 1.0% |
| Cheddar flavor | 0.5% |
| Guar Gum | 0.8% |

The above description has been that of a preferred embodiment of the present invention. It will occur to those that practice the art that many modifications may be made without departing from the spirit and scope of the invention. For example, the composition of the rice-based cheese substitute 16 with respect to its minor ingredients may be varied, particularly with respect to emulsifiers and flavoring agents. In order to appraise the public of the various embodiments that may fall within the scope of the invention, the following claims are made.

We claim:

1. An apparatus for manufacture of reduced and low-fat pasta filata cheese from standard pasta filata cheese and a rice-based cheese substitute, the apparatus comprising:

a kneader having:
   (i) a kneading vessel including a receiving opening accepting standard pasta filata cheese;
   (ii) at least one motor driven kneader positioned to move within the kneading vessel to alternately stretch and compress the standard pasta filata cheese without a substantial cutting of fibers of the pasta filata cheese;

a spray head directed into the kneading vessel; and a pump receiving rice-based cheese substitute and forcing it under pressure to the spray head;

whereby natural pasta-filata cheese held in the kneading vessel receives a surface coating of the rice-based cheese substitute which is incorporated around the fibers of the cheese without a substantial cutting of the fibers.

2. The apparatus of claim 1 wherein the kneading vessel includes a heating jacket.

3. The apparatus of claim 1 wherein the heating jacket is regulated to a temperature of 140–150 degrees Fahrenheit.

4. The apparatus of claim 1 wherein the kneader comprises at least one auger.

5. The apparatus of claim 1 wherein the kneader comprises two substantially parallel and intermeshing, counter-rotating augers.

6. The apparatus of claim 1 wherein the kneading vessel is an elongate trough and the kneader is an auger and wherein the receiving opening is positioned at one end of the trough and wherein the opposite end of the trough includes an exit opening wherein the auger turns so as to advance the combined standard pasta filata cheese and rice-based cheese substitute along the trough from the receiving opening to the exit opening on a substantially continuous basis as the cheese is stretched and compressed.

7. The apparatus of claim 1 wherein the exit opening is raised with respect to the receiving opening.

8. The apparatus of claim 1 including a macerator having a hopper for receiving the rice-based cheese substitute and liquefying it for receipt by the pump.

9. The apparatus of claim 8 wherein the macerator includes a heating jacket for heating the rice-based cheese substitute to 185–190 degrees Fahrenheit prior to receipt by the spray head.

* * * * *